May 24, 1938.  G. S. DIAMOND  2,118,641
KILN FURNITURE
Filed Nov. 13, 1936    6 Sheets-Sheet 1

INVENTOR
Grant S. Diamond
BY Parker, Brockman & Farmer
ATTORNEYS.

May 24, 1938.  G. S. DIAMOND  2,118,641
KILN FURNITURE
Filed Nov. 13, 1936   6 Sheets-Sheet 2

INVENTOR
Grant S. Diamond
BY
Parker, Rockwood & Farmer.
ATTORNEYS

May 24, 1938.   G. S. DIAMOND   2,118,641
KILN FURNITURE
Filed Nov. 13, 1936   6 Sheets-Sheet 3

INVENTOR
Grant S. Diamond
BY
Parker, Rockwood & Farmer
ATTORNEYS.

May 24, 1938.   G. S. DIAMOND   2,118,641
KILN FURNITURE
Filed Nov. 13, 1936   6 Sheets-Sheet 5

INVENTOR
Grant S. Diamond
BY
Parker, Buckman & Farmer
ATTORNEYS

May 24, 1938.  G. S. DIAMOND  2,118,641
KILN FURNITURE
Filed Nov. 13, 1936   6 Sheets-Sheet 6

INVENTOR
Grant S. Diamond
BY
Parker, Rockwell & Farmer
ATTORNEYS

Patented May 24, 1938

2,118,641

UNITED STATES PATENT OFFICE 2,118,641

KILN FURNITURE

Grant S. Diamond, Hamburg, N. Y., assignor to Electro Refractories & Alloys Corporation, Buffalo, N. Y.

Application November 13, 1936, Serial No. 110,714

13 Claims. (Cl. 25—142)

This invention relates to improvements in kiln furniture of the kind used in kilns for supporting ceramic products during the firing of the same.

The firing of ceramic products is commonly carried on in a tunnel type of furnace through which ceramic ware passes while supported on cars or trucks, which move slowly through the kiln. Such kiln may either be in the form of a straight tunnel or in the form of a circular tunnel. The furniture to which this invention relates is supported on the cars or trucks and forms a series of shelves upon which the articles to be fired may be supported. This furniture or supporting structure is, consequently, subjected to temperatures varying from atmospheric to 2500° F. and over, and at times certain portions of the furniture of a car will be subjected to different temperatures than other portions of the furniture on the same car. In order to stand these high temperatures, silicon carbide has been used in the making of kiln furniture, and since this material has peculiar characteristics of its own, kiln furniture heretofore made of silicon carbide has had certain defects.

One of the objects of this invention is to provide kiln furniture which may be made of silicon carbide and which is so constructed as to overcome defects heretofore found in kiln furniture. Another object of this invention is to provide kiln furniture by means of which a ware supporting structure can be built up in such a manner that the horizontal shelves or batts supporting the furniture are movable horizontally relatively to the supporting posts or upright members, so that these shelves are free to expand and contract and also are removable from the ware supporting structure to facilitate the placing of the ware on the structure and to remove the same therefrom. A further object of this invention is to provide kiln furniture in which the upright supporting members or posts of the ware supporting structure are relatively short and are supported from other posts without resting upon shelves or batts supported by such other posts. Another object of the invention is to provide kiln furniture by means of which a ware supporting structure can be built in which the upright supports are formed of relatively short posts superimposed one upon the other, each of which is free to expand and contract independently of other posts. Another object of this invention is to provide kiln furniture of exceptional strength and durability but which is light in weight and of relatively small volume so as to require the minimum of heat to raise the furniture itself to the temperatures existing in the interior of the kiln.

Other objects of the invention will appear from the following description and claims.

Figure 1:
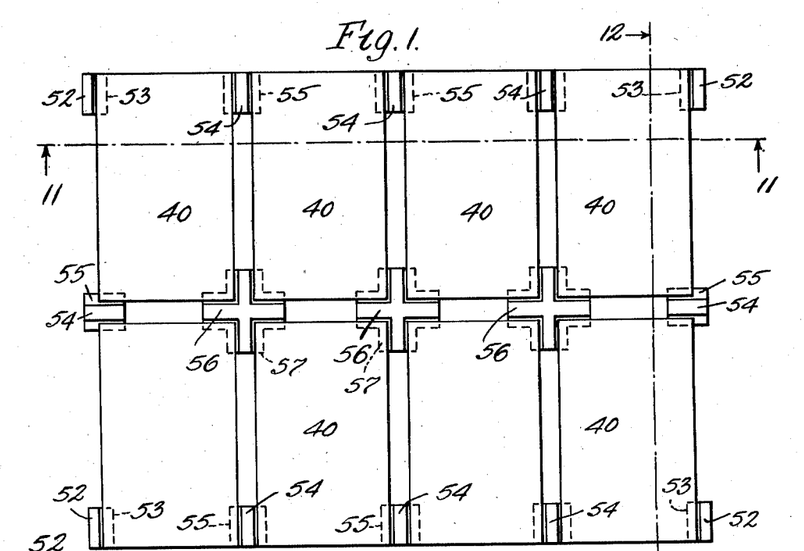
Fig. 1 is a top plan view of a ware supporting structure embodying this invention.
Figures 2, 3:
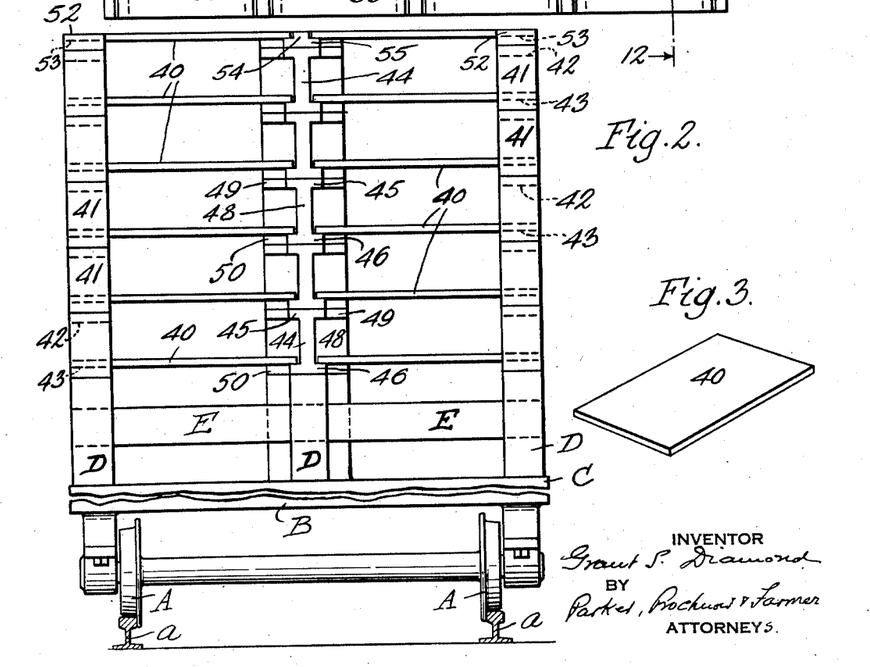
Fig. 2 is an end elevation thereof showing the structure mounted on a car or truck for use in a kiln.
Fig. 3 is a perspective view of a shelf or batt used in the supporting structure.
Figure 4:
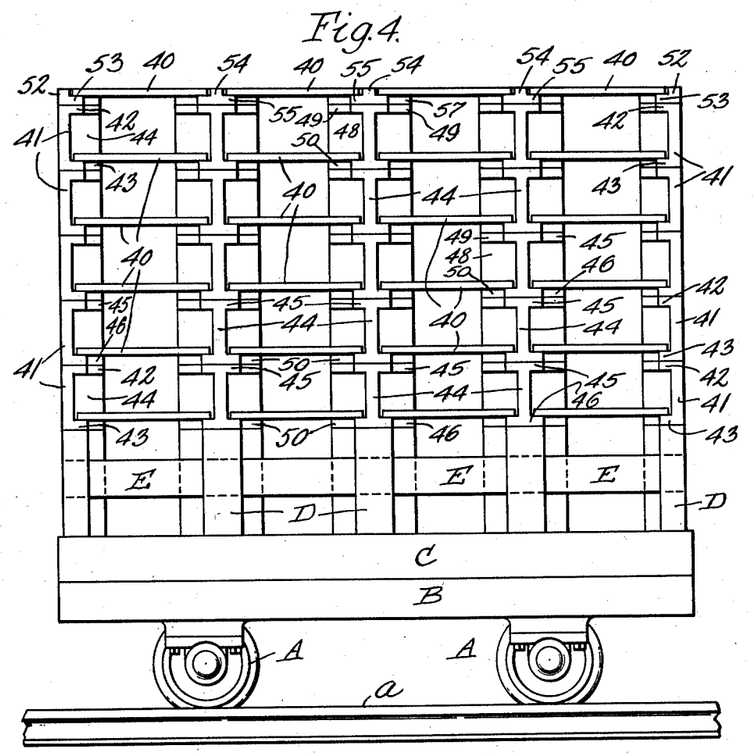
Fig. 4 is a side elevation of the ware supporting structure and of the car.
Figure 5:
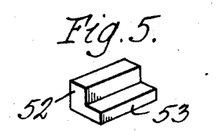
Figs. 5 to 10 inclusive are perspective views of various parts or units used for forming the upright posts or columns of the structure shown in the preceding figures.
Figures 6, 7, 9, 10:
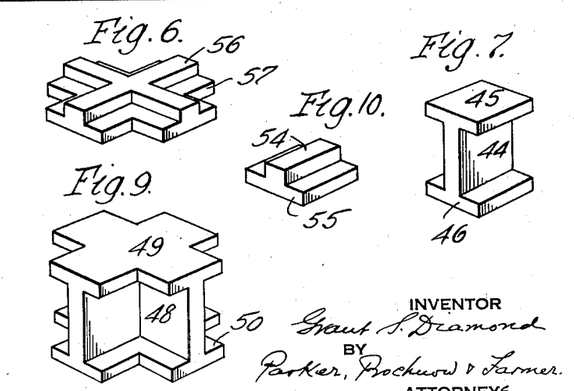
Figure 8:
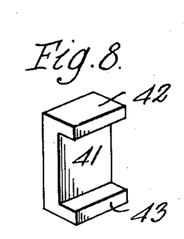
Figure 11:
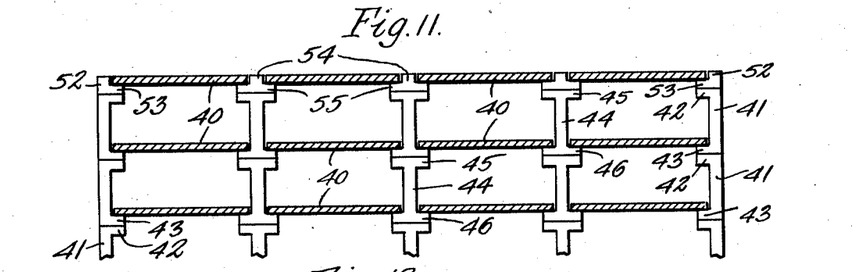
Figs. 11 and 12 are respectively a fragmentary longitudinal section on line 11—11, Fig. 1, and a fragmentary transverse section on line 12—12, Fig. 1.
Figure 12:
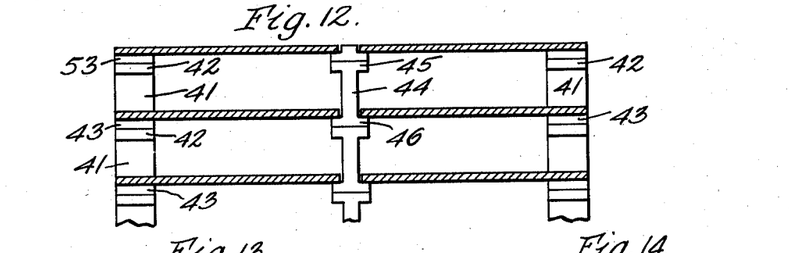
Figure 13:
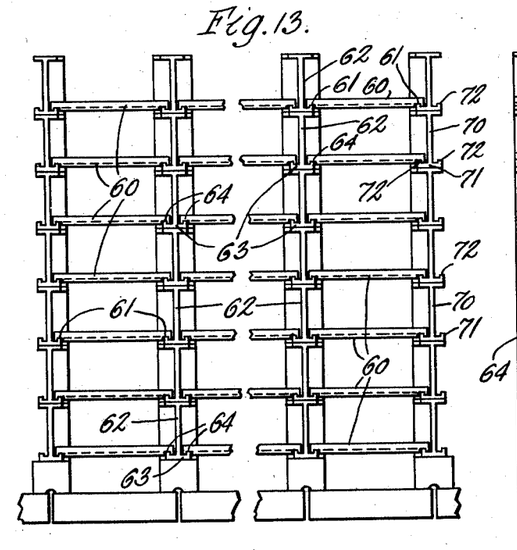
Fig. 13 is a fragmentary side elevation of a ware supporting structure of modified construction.
Figure 14:
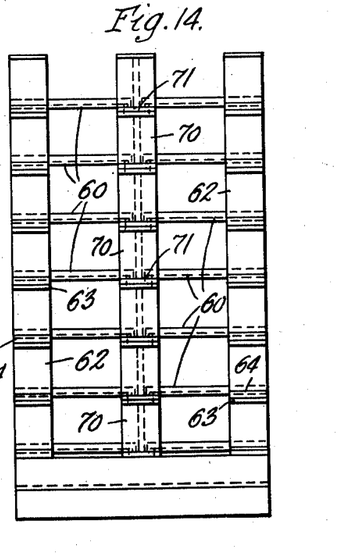
Fig. 14 is an end elevation thereof.
Figure 15:
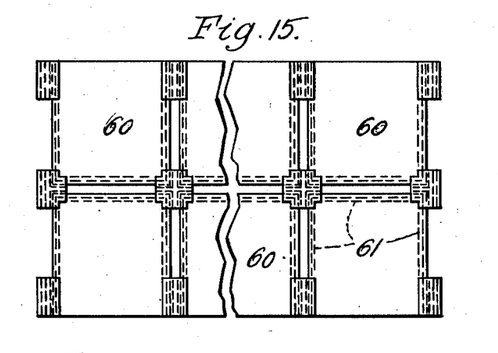
Fig. 15 is a fragmentary top plan view thereof.
Figure 16:
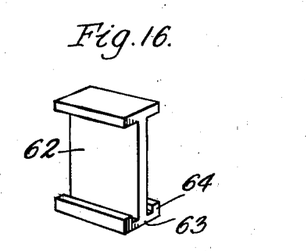
Figs. 16 to 18 inclusive are perspective views of upright posts employed in connection with the construction shown in Figs. 13 to 15 inclusive.
Figure 17:
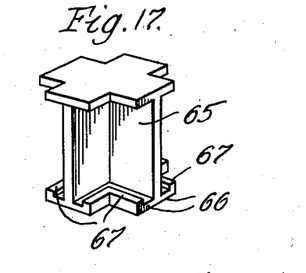
Figure 18:
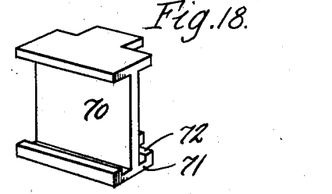
Figure 19:
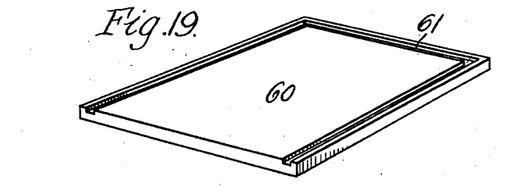
Fig. 19 is an inverted perspective view of a shelf or batt for use in connection with this construction.

The kiln furniture embodying this invention may be used in any suitable manner for supporting the ware to be fired in a kiln, and by way of example, I have illustrated the ware supporting structure in Figs. 2 and 4 as mounted on a car or truck which may be passed through a tunnel kiln, the truck including wheels A arranged to operate on tracks a. The trucks have a suitable frame B, which may be made at least in part of metal, since it is not exposed to excessively high temperatures and which may support a floor or platform C of clay or other refractory and heat insulating material and preferably, additional refractory structure may be provided above the floor or platform C, such for example as a series of blocks D supporting additional horizontal refractory heat insulating members or platforms E which may also be of clay or of a clay bonded composition. As shown, the blocks D extend above the upper surface of the platform E and these blocks may support on their upper surface the ware supporting structure embodying this invention. All of the parts hereinbefore described may be of any other suitable or desired construction and constitute no part of this invention. It will also be understood that it is not intended to limit this invention for use only on cars or trucks which move through tunnel kilns, since kiln furniture embodying this invention may be used in connection with any type of kiln.

In the particular construction illustrated in Figs. 1 to 12, I provide a ware supporting structure for a series of substantially horizontal shelves or batts 40, including a series of upright columns built up of individual posts placed one upon the other, the posts preferably being not materially greater in height than the distance between the shelves or batts 40. The individual posts from which the columns are built up are preferably provided with upright webs or body portions having flanges arranged at their upper and lower ends, and in building up the posts to form columns, the lower flange of one post rests upon the upper flange of the post below. The batts rest upon the upper faces of the lower flanges of the posts. The posts may be of any suitable or desired form, and in the construction shown in Figs. 1 to 12, three different forms of posts are employed, depending upon whether the post partly supports one, two or four shelves.

In the case of the posts provided at the corners of the structure, which, consequently, each support only one corner of a shelf or batt, upright webs 41 are provided with inwardly extending upper and lower flanges 42 and 43 respectively, which both extend in the same direction from the upright web 41. In the case of posts provided at the sides of the structure between corners and each of which supports the corners or edges of two adjacent shelves, the posts have upper and lower flanges projecting in opposite directions from the upright web. These posts are, consequently, of I-shaped cross section, being provided with upright webs 44 having upper or lower flanges or projections 45 and 46 at the upper and lower ends thereof respectively. It will be noted that when these posts are assembled to form the upright supporting members of the structure, the upper flanges or ledges 42 and 45 support the lower flanges or ledges 43 and 46 of the next higher post and the batts or shelves 40 are placed upon the lower ledges or flanges 43 and 46. It will also be noted that the posts are so spaced with relation to the batts or shelves that the edge portions of the batts are spaced from the upright webs 41 and 44 of the posts. Consequently, each batt or shelf is free to move relatively to the post both during expansion and contraction and also during removal of the batt or shelf from the structure.

At the middle portion of the ware supporting structure, the posts are so formed as to engage and support the four adjacent corners of four shelves or batts 40 and for this purpose, the posts are so formed that the upright webs thereof are cross-shaped in horizontal section, as indicated at 48 and have upper and lower flanges or projections 49 and 50 arranged between the arms of the cross-shaped upright web 48. These inner posts for supporting four corners of the shelves or batts are arranged one above the other in the same manner as the posts which have already been described, and the column thus formed provides projections or ledges, formed by the lower flanges of each post, upon which the corners of the batts or shelves may rest.

It will be noted that the post construction described not only supports the shelves, but also positions the shelves in correct relation to each other in such a manner that all corners thereof will be properly supported to have sufficient bearing on the ledges or projections of the posts. At the upper ends of the structure, it may, consequently, be desirable to provide similar positioning and spacing means for the upper batts or shelves 40, and if this is desired, short spacing or cap members may be provided at the upper ends of the several columns, which differ from the posts only in that the upright webs are short, just sufficient to hold the shelves or batts in place, and in that these positioning members have only lower flanges or horizontal webs of the same shape as and seating upon the upper ledges or webs of the corresponding posts. The spacing member or cap for use in connection with the corner columns may, for example, include a short upright web or rib 52 and a horizontal web or flange 53 corresponding in size to the flange 42 of the posts of the column. The flange 53 need only be high enough to limit the movement of the upper shelves or batts 40. The cap or spacing member for use on the upright ends of the columns partly supporting two batts includes an upright web or rib 54 and a horizontal flange 55 extending toward opposite sides of the upright web, the flange 55 being of the same size and shape as the flanges 45 of the posts used in this column. The caps or spacing members for the middle columns supporting four corners of adjacent batts or shelves each include an upright web or rib 56 and a horizontal flange 57 corresponding in shape and size to the flange 49 of the posts used in these columns. The flanges 53, 55 and 57 each rest upon the corresponding upper flanges of the posts upon which the caps are placed and the edge portions of the batts rest upon the upper faces of these flanges of the caps.

The construction described forms a secure and rigid structure in that the upper and lower flanges of the posts cooperate to enable these posts to be built up into a strong and rigid column, and furthermore, by supporting the batts or shelves on the upper faces of the lower flanges of the posts, the batts are free to expand and contract due to changes in temperature and each batt carries only the weight of the ware supported thereby together with its own weight, but not the weight of any other batts or shelves, nor the weight of any posts. It will be clearly seen that any of the shelves or batts shown may be readily removed toward opposite sides of the structure, so that if it is desired to remove a batt or shelf from the structure for the purpose of positioning the ware thereon, or for removing the ware therefrom, this can readily be done. It will be also noted that the construction of the columns by means of a series of short posts placed one upon another results in a structure which is much less affected and subject to damage by variations in temperature conditions than is the case with integral or one-piece columns. If, for example, the structure while in a kiln is subjected to different temperatures at different portions thereof, each post of a column is free to expand and contract independently of any other post of the column. Consequently, there are practically no internal strains set up in the columns, due to temperature changes, whereas with a single piece column, if one portion is exposed to different temperatures than another portion, checking or cracking would result, which would damage the post and which may even cause the same to break. Repairs and replacements are also greatly facilitated by means of the construction shown, since any post which becomes damaged can readily be replaced by another at small expense and without necessitating much tearing down of the structure to remove the defective post and replace it with a new one. The fact that the posts do not stand upon the corners or edges of the batts, as was common practice heretofore, also greatly facilitates the removal and replacement of parts of the structure, since any group or tiers of batts supported by a column containing a damaged post can be easily removed without affecting other columns.

In Figs. 13 to 19 inclusive, I have illustrated a slightly modified construction in which the batts or shelves are constructed to interlock with adjacent posts, and thus produce a more rigid structure. In the construction illustrated, the lower flanges of each post are provided with integral parts which interlock with parts of the shelves or batts. Any suitable interlocking means may be employed, and in the construction shown for this purpose, each shelf or batt 60 is provided on its under face with a groove 61, that shown extending around three sides thereof. The lower flanges of the posts are provided with upstanding lips or beads adapted to enter into the grooves 61. For example, the upright posts 62 which are used on the outer portions of the structure and which are of I-shaped cross section, are provided on their lower flanges 63 with upwardly extending lips or beads 64 adapted to fit loosely within the grooves 61 of the batts. The middle posts are of similar shape to those used in the construction shown in Figs. 1 to 12 inclusive, having upright webs 65 of cross shape in horizontal cross section, and the lower projections or flanges 66 of these posts are in the form of corner portions provided with upwardly extending parts, such as angle-shaped beads or lips 67 which are formed to enter into corners of a groove 61 of adjacent batts or shelves. In the middle portions of each end of the ware supporting structure, I also provide a post having an upright flange 70 of approximately T-shaped horizontal cross section and having a lower flange 71 which forms angular corner pieces to receive adjacent corners of two batts, and these corner pieces are also provided with angle-shaped upwardly extending lips or beads 72 adapted to enter into the corner portions of the grooves of two adjacent batts.

By means of this construction, each post of each column is connected or interlocked with adjacent posts by means of the batts or shelves, so that a strong and rigid construction results, in which the batts or shelves are positively held in correct engagement with the posts, so that if the structure is subjected to jars or vibrations, no shelf can move out of engagement with ledges or flanges of the supporting posts and thus drop out of its correct position. It will be understood, of course, that the interlocking parts of the posts and shelves may be of other forms than those shown, and it will also be evident that this interlocking structure may be used in connection with kiln furniture of other constructions.

Another modification is shown in Figs. 20 to 25 inclusive, in which the upright posts are provided with somewhat larger or thicker upright webs 75 having flanges or extensions at their upper ends only, the lower ends of the upright webs of the posts resting directly upon the upright surfaces of the flanges or webs of the next lower post. In this construction, the posts provided for the middle portions of the structure have upright webs 75 of substantially rectangular cross section and are provided at their upper ends with flanges or ledges 76 extending outwardly from all sides of the upright webs 75. The middle portions of the upper ends of these posts support the lower end of the upright web 75 of the next higher post, while the flanges or ledges support the edges of the shelves or batts 77. The posts used at the edges of the structure may be provided with upright webs 78 which are also of substantially rectangular cross section and which have at their upper portions, flanges or ledges 79 which extend outwardly from three sides of the posts in positions to support the batts or shelves 77. As will be seen by referring to Fig. 25, these batts or shelves have their corners recessed or cut inwardly, as indicated at 80, so as to fit around the upright webs 75 and 78 of the posts. The corner posts are provided with upright webs 81 having a ledge or flange 82 extending around two sides of the upper portion of the post into position to engage a recess 80 of the corner of the shelf or batt 77.

In this construction, the caps or short posts at the upper ends of the columns which have been described in connection with Figs. 1 to 12 inclusive, are omitted and instead the upper batts 84 are made of rectangular cross section, without recessed corners, and rest upon the upper faces of the top posts of the columns.

Figure 20:
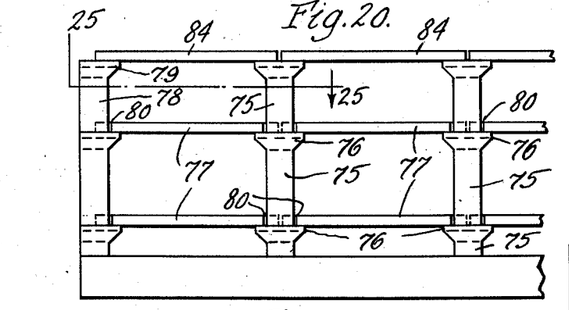
Fig. 20 is a fragmentary side elevation of a ware supporting structure provided with upright posts of another modified construction.
Figure 21:
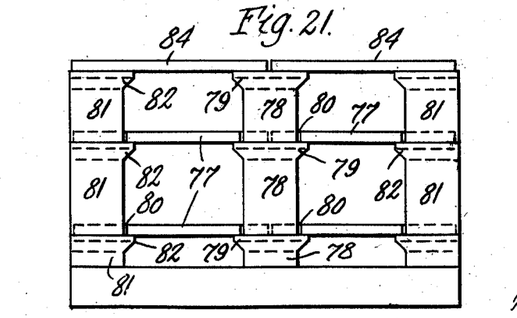
Fig. 21 is an end view thereof.
Figure 22:
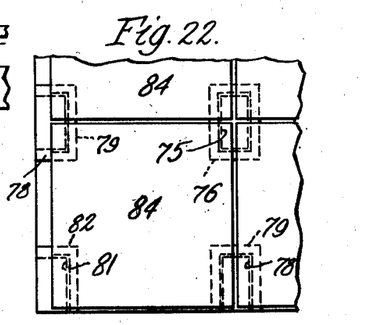
Fig. 22 is a fragmentary top plan view thereof.
Figure 23:
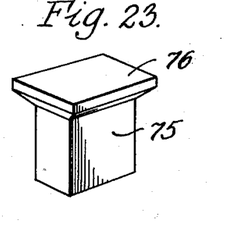
Figs. 23 and 24 are perspective views of upright supporting members or posts employed in the structure shown in Figs. 20 to 22 inclusive.
Figures 24, 25:
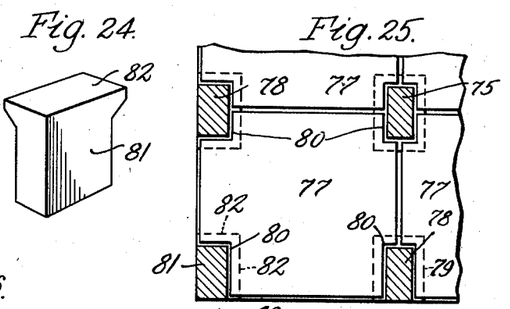
Fig. 25 is a fragmentary sectional plan view thereof, on line 25—25, Fig. 20.
Figure 26:
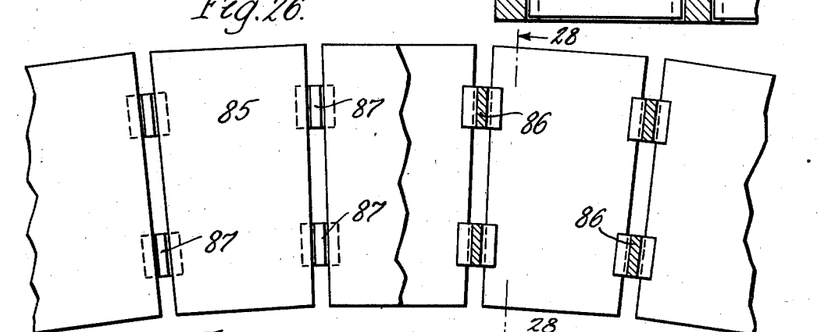
Fig. 26 is a top plan view, partly in section, of a ware supporting structure of modified form.
Figure 27:
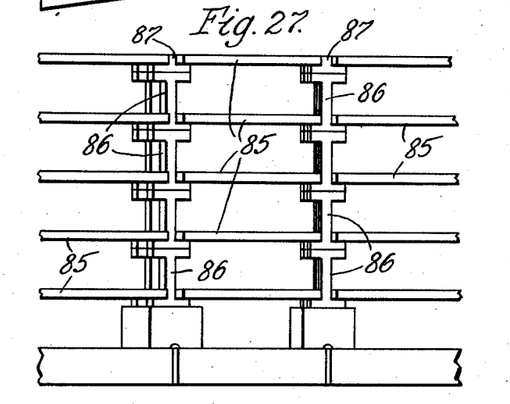
Fig. 27 is a fragmentary side elevation thereof.
Figure 28:
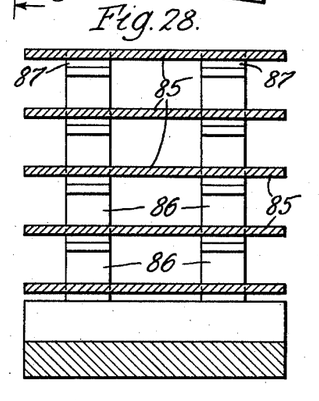
Fig. 28 is a transverse sectional elevation thereof on line 28—28, Fig. 26.
Figure 29:
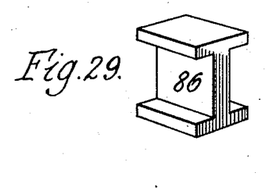
Figs. 29 and 30 are perspective views of parts or units used for forming the upright columns of the structure shown in Figs. 26 to 28.
Figure 30:
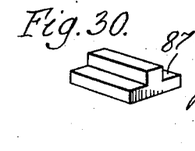
Figure 31:
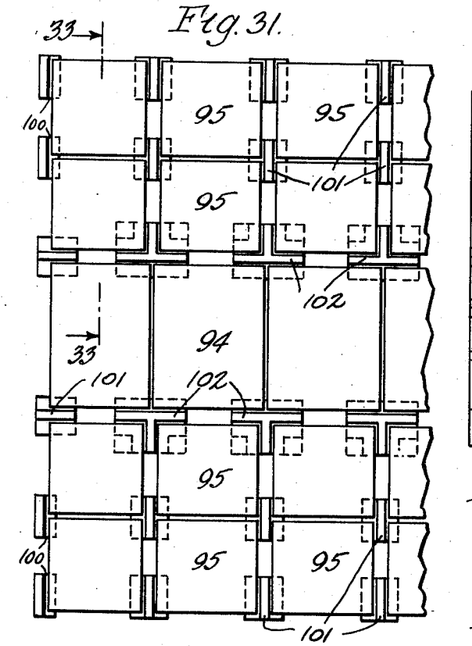
Fig. 31 is a fragmentary top plan view of a ware supporting structure of still another modified form.

The construction disclosed in Figs. 20 to 25 inclusive is desirable for the reason that the posts can readily be made of different lengths, as clearly shown in Figs. 20 and 21, thereby varying the lengths of the upright webs 75, 78 and 81. For example, if short posts are desired, the longer ones may be cut down or the molds from which these posts are altered without requiring different molds for different sizes of posts.

In Figs. 26 to 30 inclusive is shown still another modified form particularly adapted for use in connection with relatively small structures in which a single shelf may be used which extends throughout the width of the structure. In this modified form of ware supporting structure, shelves or batts 85 are provided of a length equal to the width of the structure and the upright columns are arranged to support the sides of the shelves or batts at distances from their ends and from the corners thereof. Columns of this kind may be built up by means of posts 86 of I-shaped form, similar to the posts shown in Fig. 7, and the posts are built up in columns in such a manner that the lower flange of one post stands upon the upper flange of the next lower post, the batts or shelves 85 resting at their edge portions on the upper surfaces of the lower flanges of the posts. Cap members 87 may be used at the upper ends of the posts corresponding to the cap members shown in Fig. 10. It will be noted that this structure is also shown as intended for use on cars of a circular tunnel kiln, and for this purpose the batts 85 are of slightly greater width at one end thereof than at the other end. In this construction, the batts can, of course, only be removed from cars at the sides of the cars farthest removed from the center of the circular kiln. The structure shown provides, for example, expansion and contraction of the batts and of the separate posts comprising the columns so that damage to the structure due to exposing different parts of the structure to different temperatures is reduced to a minimum.

Figures 32, 36, 37, 38, 39:
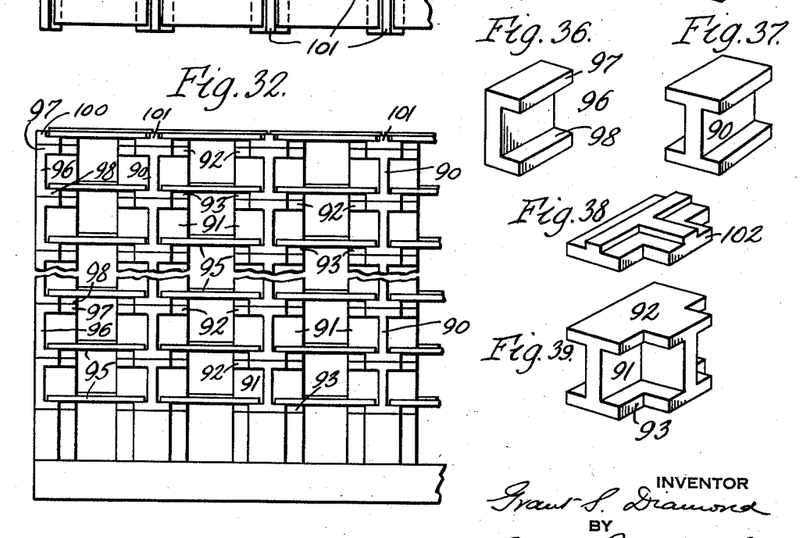
Fig. 32 is a fragmentary side elevation thereof.
Figs. 34 to 39 inclusive are perspective views of parts or units of which the upright columns of the structure shown in Figs. 31 to 33 inclusive are formed.
Figure 33:
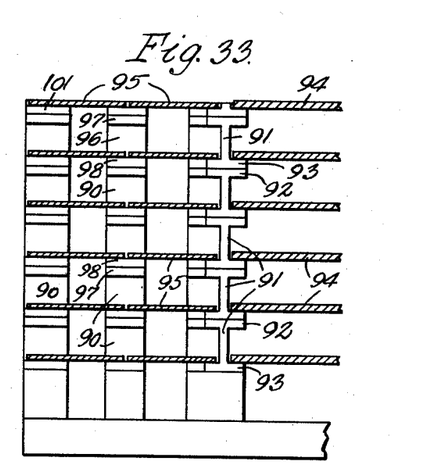
Fig. 33 is a fragmentary sectional elevation thereof on line 33—33, Fig. 31.
Figure 34:
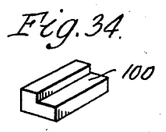
Figure 35:
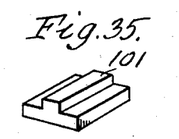

In Figs. 31 to 39 inclusive is illustrated a structure of somewhat larger size than those heretofore described, but in which the columns are made up of individual posts which are similar in construction to those described in connection with Figs. 1 to 12 inclusive. In this construction, the shelves of a vertical series are removable sidewise in the middle portion of the structure to form an aisle or passage transversely through the middle portion of the structure into which operatives may enter to place the ware upon the batts or shelves arranged at opposite sides of the aisle, and to remove the ware therefrom. The central portion of the structure is, consequently, formed by means of two sets of columns, the end columns being formed of individual posts 90 of I-shape, as shown in Fig. 37. The interior columns adjacent to the central aisle of the structure are formed of upright posts each adapted to support the corners of four adjacent batts and having an upright web 91 substantially of T-shape in horizontal cross section and provided with upper and lower flanges 92 and 93. In this construction, two sizes of batts or shelves are preferably employed, the aisle shelves 94 being larger in area and preferably also thicker than the shelves 95 which are spaced at opposite sides of the aisle. The smaller batts or shelves 95 adjacent to the aisles are supported partly upon the aisle columns and partly upon columns spaced from the aisles. The latter columns may be of two kinds, those arranged at the opposite sides of the structure being formed of posts having upright webs 96 and upper and lower flanges 97 and 98 extending in one direction only from the upright webs 96. The other columns of the structure may be formed of I-shaped posts 90. The upright webs of all of these posts are arranged to extend lengthwise of the structure, so that the shelves or batts 95 can be removed or positioned in the structure from opposite ends of the same. The several columns may be provided at their ends with caps 100, 101 and 102, which are similar in function and purpose to those described in connection with other figures of the drawings.

In the use of the structure shown in Figs. 31 to 39 inclusive, the shelves or batts 94 are either entirely or partly removed, so that the batts 95 adjacent to the aisle can be readily reached for positioning the ware thereon. The shelves or batts 95 adjacent to the ends of the structure can, of course, be filled from the opposite ends. After all of the shelves 95 have been loaded with the ware, the larger shelves or batts 94 may be positioned in the aisle and the ware may be placed thereon. In unloading the structure, the opposite procedure, of course, may be followed, all of the ware being removed from the exterior of the structure so far as possible, whereupon the outer tier of shelves 94 adjacent to opposite sides of the structure may be removed to afford access to the next tier of shelves 94 in the aisle and to the adjacent tiers of shelves or batts 95 at opposite sides of the aisle. In this structure, as well as in the others which have been described, all of the batts are supported in such a manner that each batt is free to expand and contract and is removable from the structure independently of other batts, and furthermore, supports only its own weight and the weight of the ware deposited thereon, and none of the weight of any other batts, nor of any posts. The columns are all constructed of posts of a height not materially greater than the distance between shelves or batts, so that if differences in temperature exist in different parts of the columns, one post may expand or contract to a greater or less extent than adjacent posts without damaging the columns.

The various structures described have the advantage that they are constructed entirely of refractory materials capable of withstanding high temperatures and include no metal parts. Such metal parts in addition to having very little strength at temperatures at which my structure is used, also oxidize and scale when subjected to high temperatures, thus damaging pottery and other ware by discoloring the same.

It will be noted that in the construction shown, the posts which form the columns are all provided with upright webs which are of greater length horizontally than width, and that these posts are placed into the structure in such a manner that the upright webs extend lengthwise of the adjacent edges of the shelves. By means of this construction, the posts can be made of such narrow width as to require very little space between adjacent shelves, so that the space upon a car or in a kiln is occupied to the maximum extent by the ware supporting shelves. By providing posts with upper and lower flanges, the narrow widths of the upright webs in no way detract from the stability of the columns formed by the posts. By means of this construction, the posts can also be made of the minimum of weight, which not only reduces the amount of refractory material required to form the posts, but also increases the efficiency of the kiln in that less heat is required to raise the kiln furniture to the temperature at which the ware is to be treated.

I claim as my invention:

1. A ware supporting structure for use in kilns, including a plurality of shelves of refractory material, posts arranged one on another to form a series of columns, each post having a laterally projecting flange portion upon which an edge portion of a shelf rests, and caps at the upper ends of said columns, each cap comprising a horizontal portion resting upon the upper post of a column, shelves resting upon the upper faces of said horizontal portions of said caps, and a vertically and upwardly extending web on said cap for correctly spacing a shelf with relation to said column.

2. A ware supporting structure for use in kilns, including a plurality of shelves of refractory material and a series of supporting columns for said shelves, said supporting columns being formed of a series of upright posts placed one upon another, each of said posts comprising an upright web, and upper and lower flanges at the ends of said web, the lower flange of one post resting upon the upper flange of the lower post, said shelves having edge portions thereof resting upon the upper faces of the lower flanges of said posts.

3. A ware supporting structure for use in kilns, including a plurality of shelves of refractory material and a series of supporting columns for said shelves, said supporting columns being formed of a series of upright posts placed one upon another, each of said posts comprising an upright web of materially greater length horizontally than width and having substantially horizontal flanges extending outwardly from opposite longitudinal faces of said upright web at the upper and lower ends of said posts, said posts being arranged with the longitudinal dimensions of their upright webs extending lengthwise of the edges of adjacent shelves, said shelves resting upon the upper faces of the lower flanges of said posts.

4. A ware supporting structure for use in kilns, including a plurality of substantially horizontal shelves of refractory material upon which the ware may be placed, and a series of upright columns, each column comprising a plurality of posts supported one upon another, each of said posts having laterally projecting flanges, the lower faces of which engage with flanges of a lower post of a column and the upper faces of which are provided with upwardly extending portions, said shelves having their edge portions resting on said upper faces and having recesses in their lower faces into which said upwardly extending portions enter when said shelves are supported on said columns to cause said shelves to form an interlocking connection between said columns.

5. A ware supporting structure for use in kilns, including a plurality of columns provided with laterally extending flanges, shelves of refractory material supported in upright tiers on said flanges, said columns and shelves being constructed and arranged to permit removal of said shelves by sliding said shelves horizontally on said flanges, said structure including an intermediate tier of shelves all of which are arranged to be removed by sliding the same horizontally on said flanges from an end of said tier to form an aisle, and other shelves arranged at opposite sides of said tier and which are accessible from said aisle after removal of the shelves of said first mentioned tier, said other shelves being removable from said structure in a horizontal direction transverse to the direction of removal of said first mentioned tier of shelves from said structure.

6. A ware supporting structure for use in kilns, including a plurality of shelves of refractory material, columns each having laterally projecting ledges for slidably supporting edge portions of said shelves, said columns and shelves being constructed and arranged to permit removal of said shelves by sliding said shelves horizontally on said flanges, the columns adjacent to the middle of said structure being provided with flanges extending in one direction from said columns to permit removal and replacement of shelves in a substantially horizontal direction in the middle portion of said structure from a side of said structure to form an aisle in the middle of said structure when the shelves of said middle portion are removed, the columns of said structure being also provided with flanges extending in a direction substantially at right angles to the direction of said first mentioned flanges for supporting other shelves removable from said structure in a horizontal direction substantially at a right angle to the direction of removal of said first mentioned shelves.

7. A ware supporting structure for use in kilns, including a plurality of spaced upright columns, each column comprising a plurality of posts arranged one upon another, each post comprising an upright web including a portion extending in an upright plane and another portion integral with said first portion and extending in an upright plane arranged substantially at a right angle to said first plane, and a laterally extending ledge formed integral with said web and arranged between and connecting two adjacent upright portions of said web, and shelves of refractory material having corner portions which rest on the ledges of posts of adjacent columns.

8. A ware supporting structure for use in kilns, including a plurality of spaced upright columns, each column comprising a plurality of posts arranged one upon another, the posts in the interior of said structure comprising upright webs integrally connected and arranged at substantially a right angle to each other to form a substantially cross shaped horizontal section, laterally projecting flanges at corner portions of said upright webs and formed integral with said webs, and shelves of refractory material having corner portions which rest on the flanges of posts of adjacent columns, whereby each of said posts is adapted to support the corners of four adjacent shelves.

9. A ware supporting structure for use in kilns, including a plurality of substantially horizontal shelves of refractory material upon which the ware may be placed, a series of upright columns, each column comprising a plurality of posts supported one upon another, each of said posts having flanges projecting laterally from the upper and lower end portions of said posts, the lower flange of one post resting upon the upper flange of an adjacent post to form a stable column, the edge portions of said shelves resting upon the upper faces of lower flanges of posts of adjacent columns, and cooperating interlocking portions on said shelves and the upper faces of the lower of said flanges for holding said shelves against substantial lateral movement relatively to said columns, said interlocking means permitting expansion and contraction of said shelves relatively to said columns.

10. In an improved truck for conveying objects through a heated kiln which comprises a truck base with a bed of refractory material having a substantially horizontal upper face, a ware supporting superstructure on said truck bed, said superstructure being formed of columns resting upon and rising from said upper face of said bed at intervals across the same, each column being formed entirely of individual posts resting freely in superposed relation one upon another, said posts being formed entirely of non-metallic refractory materials, the areas of the upper and lower surfaces of said posts which contact with adjacent posts of a column being sufficient to form a self-supporting column, certain of said posts in each column having upright webs and ledges extending laterally therefrom, and shelves of refractory material resting upon the ledges of spaced columns, whereby each shelf supports solely its own load and said columns carry the aggregate loads of said shelves.

11. A superstructure for trucks according to claim 10 characterized in that said shelves have horizontal dimensions less than the corresponding distances between the upright webs of the posts between which they extend, to provide expansion clearance between the edges of the shelves and said webs.

12. In an improved truck for conveying objects through a heated kiln which comprises a truck base with a bed of refractory material, a ware supporting superstructure on said truck bed, said superstructure being formed of columns resting upon and rising from said bed at intervals across the same, each column being formed entirely of individual posts comprising upright webs of materially greater length in a horizontal direction than thickness and having laterally extending ledges at their upper and lower ends, said ledges extending from the faces of greater horizontal length of said webs, said posts resting freely in superposed relation one upon another with the ledge of the upper end of one post engaging the ledge at the lower end of the next higher post of a column, and shelves of refractory material resting upon the ledges of spaced columns and arranged with opposite edges of a shelf extending substantially in a straight line and parallel to the length of the upright webs of adjacent posts, to permit removal and replacement of said shelves in the direction of the length of said upright webs.

13. In an improved truck for conveying objects through a heated kiln which comprises a truck base with a bed of refractory material, a ware supporting superstructure on said truck bed, said superstructure being formed of columns resting upon and rising from said bed at intervals across the same, each column being formed of posts resting in superposed relation one upon another, the upper and lower ends of said posts having laterally extending flanges, the lower flange of one post resting upon the upper flange of a lower post to form extended supporting surfaces which impart stability to said columns, and ware supporting shelves of refractory material supported at their edge portions on the upper faces of the lower flanges of said posts of different columns.

GRANT S. DIAMOND.